(12) United States Patent  
Nomura et al.

(10) Patent No.: US 9,172,936 B2  
(45) Date of Patent: *Oct. 27, 2015

(54) INTER-VIDEO CORRESPONDING RELATIONSHIP DISPLAY SYSTEM AND INTER-VIDEO CORRESPONDING RELATIONSHIP DISPLAY METHOD

(75) Inventors: Toshiyuki Nomura, Minato-ku (JP); Kota Iwamoto, Minato-ku (JP); Takami Sato, Minato-ku (JP); Ryota Mase, Minato-ku (JP); Naotake Fujita, Minato-ku (JP); Kouichi Ueda, Minato-ku (JP); Takato Ozawa, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 190 days.

This patent is subject to a terminal disclaimer.

(21) Appl. No.: 13/980,110

(22) PCT Filed: Nov. 28, 2011

(86) PCT No.: PCT/JP2011/077377  
§ 371 (c)(1),  
(2), (4) Date: Jul. 17, 2013

(87) PCT Pub. No.: WO2012/108089  
PCT Pub. Date: Aug. 16, 2012

(65) Prior Publication Data  
US 2013/0302017 A1 Nov. 14, 2013

(30) Foreign Application Priority Data

Feb. 10, 2011 (JP) .................................. 2011-027189

(51) Int. Cl.  
*H04N 9/80* (2006.01)  
*H04N 9/82* (2006.01)  
(Continued)

(52) U.S. Cl.  
CPC .................. *H04N 9/80* (2013.01); *G11B 27/34* (2013.01); *G11B 27/36* (2013.01); *H04N 5/76* (2013.01);  
(Continued)

(58) Field of Classification Search  
None  
See application file for complete search history.

(56) References Cited

U.S. PATENT DOCUMENTS 6,088,703 A 7/2000 Kaneko  
2001/0020953 A1 9/2001 Moriwake et al.  
(Continued)

FOREIGN PATENT DOCUMENTS

JP 10-149673 A 6/1998  
JP 10-224665 A 8/1998  
(Continued)

OTHER PUBLICATIONS

Eiji Kasutani, et al., "Video Materials Archive System for Efficient Video Editing based on MPEG-7", IPSJ SIG Notes 2003-AVM-40, Mar. 7, 2003, pp. 49-54, vol. 2003, No. 24.

*Primary Examiner* — Hung Dang  
*Assistant Examiner* — Sunghyoun Park  
(74) *Attorney, Agent, or Firm* — Sughrue Mion, PLLC

(57) ABSTRACT

To enable a utilization frequency of each segment in a source video to be readily assessed between videos in a corresponding relationship during a creation process. Relationship information that is information indicating a segment in a corresponding relationship between a source video and a plurality of derived videos created using at least a part of segments of the source video is stored in a relationship information storing unit, and a corresponding relationship of the segment between the source video and the plurality of derived videos and a utilization frequency of each segment of the source video by the plurality of derived videos are displayed based on the relationship information stored in the relationship information storing unit.

10 Claims, 11 Drawing Sheets

(51) Int. Cl.
  *H04N 5/76* (2006.01)
  *H04N 21/231* (2011.01)
  *H04N 21/234* (2011.01)
  *H04N 21/8352* (2011.01)
  *H04N 21/845* (2011.01)
  *G11B 27/34* (2006.01)
  *G11B 27/36* (2006.01)
  *H04N 5/91* (2006.01)
  *G11B 20/00* (2006.01)

(52) U.S. Cl.
  CPC ........... *H04N 9/8205* (2013.01); *H04N 9/8227* (2013.01); *H04N 21/23109* (2013.01); *H04N 21/23418* (2013.01); *H04N 21/8352* (2013.01); *H04N 21/8456* (2013.01); *G11B 20/00181* (2013.01); *H04N 5/91* (2013.01)

(56) References Cited

U.S. PATENT DOCUMENTS

| 2005/0188319 | A1 | 8/2005 | Shinkai |
| 2006/0015890 | A1 | 1/2006 | Kasutani et al. |
| 2006/0242184 | A1* | 10/2006 | Shur et al. ............ 707/102 |
| 2008/0306995 | A1* | 12/2008 | Newell et al. ............ 707/104.1 |

FOREIGN PATENT DOCUMENTS

| JP | 11-266422 A | 9/1999 |
| JP | 2004-172787 A | 6/2004 |
| JP | 2004-172788 A | 6/2004 |
| JP | 2005-148801 A | 6/2005 |
| JP | 2005-203881 A | 7/2005 |
| JP | 2007-164633 A | 6/2007 |
| JP | 2010-282376 A | 12/2010 |
| WO | 2010/073695 A1 | 7/2010 |
| WO | 2010/084714 A1 | 7/2010 |

* cited by examiner

COVERAGE VIDEO DATABASE 

| VIDEO IDENTIFIER | ATTRIBUTE INFORMATION | | | | VIDEO DATA |
|---|---|---|---|---|---|
| | TITLE | CREATION DATE/TIME | DURATION | ... | |
| C1 | ATTRIBUTE C1 | | | | VIDEO DATA C1 |
| C2 | ATTRIBUTE C2 | | | | VIDEO DATA C2 |
| C3 | ATTRIBUTE C3 | | | | VIDEO DATA C3 |
| ⋮ | ⋮ | | | | ⋮ |

FIG. 2

EDITED VIDEO DATABASE 

| VIDEO IDENTIFIER | ATTRIBUTE INFORMATION | | | | VIDEO DATA |
|---|---|---|---|---|---|
| | TITLE | CREATION DATE/TIME | DURATION | ... | |
| E1 | ATTRIBUTE E1 | | | | VIDEO DATA E1 |
| E2 | ATTRIBUTE E2 | | | | VIDEO DATA E2 |
| E3 | ATTRIBUTE E3 | | | | VIDEO DATA E3 |
| ⋮ | ⋮ | | | | ⋮ |

FIG. 3

BROADCAST VIDEO DATABASE 46

| VIDEO IDENTIFIER | ATTRIBUTE INFORMATION | | ... | VIDEO DATA | FREQUENCY INFORMATION |
|---|---|---|---|---|---|
| | TITLE | CREATION DATE/TIME | DURATION | | |
| B1 | ATTRIBUTE B1 | | | VIDEO DATA B1 | 1 |
| B2 | ATTRIBUTE B2 | | | VIDEO DATA B2 | 1 |
| B3 | ATTRIBUTE B3 | | | VIDEO DATA B3 | 3 |
| ... | ... | | | ... | ... |

FIG. 4

REGION SPLITTING

↙ 60

| 0 | 1 | 2 | 3 | 4 | 5 | 6 | 7 | 8 | 9 | 10 | 11 | 12 | 13 | ... | 31 |
|---|---|---|---|---|---|---|---|---|---|---|---|---|---|---|---|
| 32 | ... | ... | ... | ... | ... | ... | ... | ... | ... | ... | ... | ... | ... | ... | ... |
| 64 | ... | ... | ... | ... | ... | ... | ... | ... | ... | ... | ... | ... | ... | ... | ... |
| 96 | ... | ... | ... | ... | ... | ... | ... | ... | ... | ... | ... | ... | ... | ... | ... |
| 128 | ... | ... | ... | ... | ... | ... | ... | ... | ... | ... | ... | ... | ... | ... | ... |
| 160 | ... | ... | ... | ... | ... | ... | ... | ... | ... | ... | ... | ... | ... | ... | ... |
| 192 | ... | ... | ... | ... | ... | ... | ... | ... | ... | ... | ... | ... | ... | ... | ... |
| 224 | ... | ... | ... | ... | ... | ... | ... | ... | ... | ... | ... | ... | ... | ... | ... |
| 256 | ... | ... | ... | ... | ... | ... | ... | ... | ... | ... | ... | ... | ... | ... | ... |
| 288 | ... | ... | ... | ... | ... | ... | ... | ... | ... | ... | ... | ... | ... | ... | ... |
| 320 | ... | ... | ... | ... | ... | ... | ... | ... | ... | ... | ... | ... | ... | ... | ... |
| 352 | ... | ... | ... | ... | ... | ... | ... | ... | ... | ... | ... | ... | ... | ... | ... |
| 384 | ... | ... | ... | ... | ... | ... | ... | ... | ... | ... | ... | ... | ... | ... | ... |
| 415 | ... | ... | ... | ... | ... | ... | ... | ... | ... | ... | ... | ... | ... | ... | ... |
| ⋮ | ... | ... | ... | ... | ... | ... | ... | ... | ... | ... | ... | ... | ... | ... | ... |
| 992 | 993 | 994 | 995 | 996 | 997 | 998 | 999 | 1000 | 1001 | 1002 | 1003 | 1004 | 1005 | ... | 1023 |

FIG. 5

COVERAGE VIDEO FEATURE AMOUNT STORING UNIT 30

| VIDEO IDENTIFIER | SEQUENCE INFORMATION | FEATURE AMOUNT VECTOR |
|---|---|---|
| 1 | 1 | (−1, +1, +1, 0, ⋯) |
| | 2 | (0, −1, 0, +1, ⋯) |
| | 3 | (0, +1, +1, 0, ⋯) |
| | 4 | (+1, 0, 0, +1, ⋯) |
| | ⋮ | ⋮ |
| 2 | 1 | (0, +1, 0, −1, ⋯) |
| | 2 | (+1, 0, 0, −1, ⋯) |
| | 3 | (0, −1, −1, 0, ⋯) |
| | 4 | (−1, −1, 0, +1, ⋯) |
| | ⋮ | ⋮ |
| ⋮ | ⋮ | ⋮ |

FIG. 7

| | SOURCE VIDEO | | | DERIVED VIDEO | | | |
|---|---|---|---|---|---|---|---|
| VIDEO TYPE | VIDEO IDENTIFIER | SEGMENT INFORMATION | VIDEO TYPE | VIDEO IDENTIFIER | SEGMENT INFORMATION | DEGREE OF MODIFICATION |
| COVERAGE | C1 | 00:00~20:00 | EDITED | E1 | 00:00~20:00 | 0 |
| COVERAGE | C1 | 20:00~40:00 | EDITED | E2 | 00:00~20:00 | 0 |
| COVERAGE | C1 | 40:00~60:00 | EDITED | E3 | 00:00~20:00 | 0 |
| ... | ... | ... | ... | ... | ... | ... |
| EDITED | E1 | 00:00~05:00 | BROADCAST | B1 | 00:00~05:00 | 2 |
| EDITED | E2 | 03:00~13:00 | BROADCAST | B1 | 05:00~15:00 | 5 |
| EDITED | E3 | 02:00~07:00 | BROADCAST | B1 | 15:00~20:00 | 1 |
| ... | ... | ... | ... | ... | ... | ... |

RELATIONSHIP INFORMATION STORING UNIT 26

INTER-VIDEO CORRESPONDING RELATIONSHIP DISPLAY SYSTEM AND INTER-VIDEO CORRESPONDING RELATIONSHIP DISPLAY METHOD

CROSS REFERENCE TO RELATED APPLICATIONS

This application is a National Stage of International Application No. PCT/JP2011/077377filed Nov. 28, 2011, claiming priority based on Japanese Patent Application No. 2011-027189 filed Feb. 10, 2011, the contents of all of which are incorporated herein by reference in their entirety.

BACKGROUND

The present invention relates to an inter-video corresponding relationship display system and an inter-video corresponding relationship display method.

The proliferation of digital videos has made it easier to use an existing video to create another video. For example, at broadcast stations, a coverage video generated as a result of coverage is edited to create an edited video. A plurality of edited videos is used to create a broadcast video that is actually used when broadcasting a program. In addition, a coverage video is not always used in one edited video and may sometimes be edited in various ways as necessary to create a plurality of edited videos. On a similar note, an edited video is not always used in one broadcast video and may sometimes be used in a plurality of broadcast videos.

As described above, corresponding relationship between videos becomes more difficult to assess as the number of videos increases. In consideration thereof, for example, as disclosed in Patent Document 1, a method is proposed for displaying corresponding relationship between videos by registering corresponding relationship among raw material videos, edited videos, and on-air videos in a database. With this method, when a video is created, a corresponding relationship between the video and other videos are registered in the database. Therefore, with respect to created videos, it is premised that corresponding relationship thereof has been registered in the database.

However, in actual practice, a plurality of videos is often generated without registering a corresponding relationship of created videos in the database. In such a case, first, a corresponding relationship between videos must be detected. For example, Patent Document 2 discloses a method of searching for a content that is similar to a given content by using feature information of the given content. In addition, for example, Patent Document 3 discloses a method of judging an identity of contents based on feature amounts of the contents for the purpose of grouping the contents.

Furthermore, for example, creating a broadcast video from an edited video may sometimes involve a modification such as adding a telop. Therefore, such modifications must be taken into consideration in order to find a video in which a corresponding relationship exists from a large number of created videos. Accordingly, for example, Patent Document 4 discloses a method capable of judging identity between videos with a high discriminatory ability even when such modifications have been made.

Patent Document 1: Patent Publication JP-A-2004-172788
Patent Document 2: Patent Publication JP-A-2005-148801
Patent Document 3: Patent Publication JP-A-2007-164633
Patent Document 4: WO 2010/084714

However, with the method disclosed in Patent Document 1, although corresponding relationship between videos is displayed, a utilization frequency of each segment in a source video cannot be readily assessed. For example, when a plurality of edited videos or broadcast videos is generated using a part of the segments of a coverage video, it is impossible to readily assess which part of the coverage video has been used to what degree. In addition, while Patent Documents 2 to 4 disclose methods of judging a similarity or an identity between videos, no disclosures are made with respect to a method that enables a utilization frequency of each segment in a source video to be readily assessed.

SUMMARY

The present invention has been made in consideration of such circumstances, and an object thereof is to enable a utilization frequency of each segment in a source video to be readily assessed between videos in which a corresponding relationship exists during a creation process.

An inter-video corresponding relationship display system according to an aspect of the present invention comprises: a relationship information storing unit configured to store relationship information that is information indicating a segment in which a corresponding relationship exists between a source video and a plurality of derived videos created using at least a part of segments of the source video; and a corresponding relationship display unit configured to display a segment corresponding relationship between the source video and the plurality of derived videos and a utilization frequency of each segment of the source video by the plurality of derived videos based on the relationship information stored in the relationship information storing unit.

Moreover, as used in the present invention, the term "unit" not only signifies physical means but also includes cases where functions of the "unit" are realized by software. In addition, functions of one "unit" or device may be realized by two or more physical means or devices, and functions of two or more "units" or devices may be realized by one physical means or device.

According to the present invention, a utilization frequency of each segment in a source video can be readily assessed between videos in which a corresponding relationship exists during a creation process.

DESCRIPTION OF DRAWINGS

FIG. 2 is a diagram showing a configuration example of a coverage video database;

FIG. 3 is a diagram showing a configuration example of an edited video database;

FIG. 4 is a diagram showing a configuration example of a broadcast video database;

FIG. 5 is a diagram showing an example of region splitting of a frame image;

FIG. 7 is a diagram showing an example of feature amount vectors stored in a feature amount storing unit;

DETAILED DESCRIPTION

Hereinafter, an embodiment of the present invention will be described with reference to the drawings.

Figure 1:
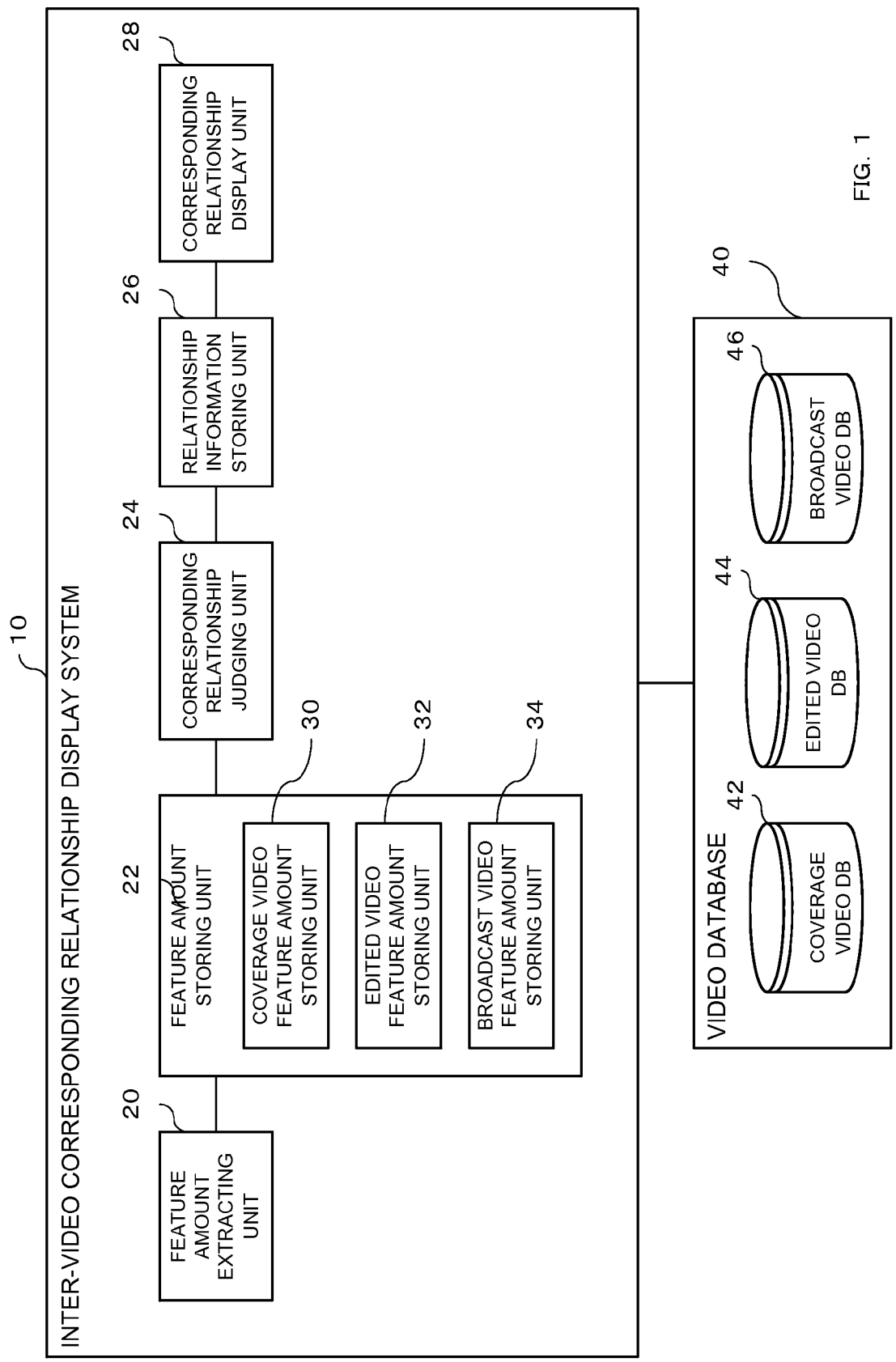
FIG. 1 is a diagram showing a configuration of an inter-video corresponding relationship display system that is an embodiment of the present invention.

FIG. 1 is a diagram showing a configuration of an inter-video corresponding relationship display system that is an embodiment of the present invention. An inter-video corresponding relationship display system 10 is a system for presenting an inter-video corresponding relationship and a utilization frequency of each segment of a source video between videos in which a corresponding relationship exists during a creation process, and is configured so as to comprise a feature amount extracting unit 20, a feature amount storing unit 22, a corresponding relationship judging unit 24, a relationship information storing unit 26, and a corresponding relationship display unit 28. As shown in FIG. 1, the feature amount storing unit 22 includes a coverage video feature amount storing unit 30, an edited video feature amount storing unit 32, and a broadcast video feature amount storing unit 34. In addition, the inter-video corresponding relationship display system 10 refers to a video database 40. The video database 40 includes a coverage video database (DB) 42, an edited video database (DB) 44, and a broadcast video database (DB) 46.

The inter-video corresponding relationship display system 10 as described above is configured using one or a plurality of information processing devices, and the feature amount extracting unit 20, the corresponding relationship judging unit 24, and the corresponding relationship display unit 28 can be realized by having a processor execute a program stored in a memory. In addition, the feature amount storing unit 22 and the relationship information storing unit 26 can be realized using a storage area of a memory, a storage device, or the like.

As used herein, "videos in which a corresponding relationship exists during a creation process" refer to, for example, a coverage video used in a broadcast station, an edited video created using at least a part of the coverage video, and a broadcast video created using at least a part of the edited video. In this case, the coverage video is a source video and the edited video or the broadcast video is a derived video from the coverage video. Moreover, videos in which a corresponding relationship exists during a creation process are not limited to videos used by a broadcast station. For example, when there is an illegal video created from a broadcast video or a video on a recording medium and which has been posted on a video site, the broadcast video or the video on the recording medium is a source video and the illegal video is a derived video. While the present embodiment will be described with a focus on videos used by a broadcast station, a corresponding relationship display system described in the present embodiment is applicable to any videos as long as a corresponding relationship exists between the videos during a creation process.

First, a configuration of the video database 40 will be described with reference to FIGS. 2 to 4. FIG. 2 is a diagram showing a configuration example of the coverage video DB 42. The coverage video DB 42 stores video data of coverage videos in association with video identifiers and attribute information. A video identifier is information for identifying a coverage video and, for example, a file name can be used. Attribute information is information indicating various attributes of a coverage video and includes, for example, a title or a creation date/time of the video and a duration of the entire video.

FIG. 3 is a diagram showing a configuration example of the edited video DB 44. The edited video DB 44 stores video data of edited videos in association with video identifiers and attribute information. The video identifiers and the attribute information are similar to those of the coverage video DB 42.

FIG. 4 is a diagram showing a configuration example of the broadcast video DB 46. The broadcast video DB 46 stores video data of broadcast videos in association with video identifiers, attribute information, and frequency information. The video identifiers and the attribute information are similar to those of the coverage video DB 42. For frequency information, for example, information is set which indicates the number of times a broadcast video has been broadcasted. For example, a value of the frequency information can be incremented each time a broadcast video is re-aired. Alternatively, a re-aired broadcast video may be stored in the broadcast video DB 46 as a video separate from the original broadcast video. In this case, attribute information can include information regarding a broadcast date/time. In addition, in a case where a broadcast video is distributed on demand from a viewer, the number of times the broadcast video has been viewed may be set as frequency information.

Moreover, while coverage videos, edited videos, and broadcast videos are to be stored in separate databases in the present embodiment, the videos may be arranged so as to be collectively stored in a single database. In this case, for example, information indicating a video type may be assigned to each video.

Returning to FIG. 1, various units which constitute the inter-video corresponding relationship display system 10 will now be described in detail.

The feature amount extracting unit 20 refers to the video database 40 to extract a feature amount vector from each of a plurality of frame images that constitutes a video and stores the feature amount vectors in the feature amount storing unit 22. In the present embodiment, feature amount vectors of coverage videos, edited videos, and broadcast videos are respectively stored in the coverage video feature amount storing unit 30, the edited video feature amount storing unit 32, and the broadcast video feature amount storing unit 34. Alternatively, feature amount vectors of coverage videos, edited videos, and broadcast videos may be arranged so as to be collectively stored in a single storing unit. In this case, information indicating a video type may be assigned to each feature amount vector.

A feature amount vector indicates a feature amount for each predetermined segment that constitutes a video. In the present embodiment, it is assumed that a feature amount vector is generated for each frame image constituting a video according to a method described in WO 2010/084714. A feature amount vector generated according to this method is a set of N-number (where N≥2) of feature amounts corresponding to N-number of subregions defined in a frame image. Each subregion corresponding to each dimension of a feature amount vector includes, for example, a plurality of subregions of a frame image. In addition, a feature amount of each dimension can be generated based on, for example, a difference among feature amounts of a plurality of subregions corresponding to each dimension.

FIG. 5 is a diagram showing an example of region splitting of a frame image. As shown in FIG. 5, for example, each frame image can be split into 32×32=1024 regions (split regions). A subregion corresponding to each dimension in a feature amount vector is constituted by a combination of one or more split regions.

Figure 6:
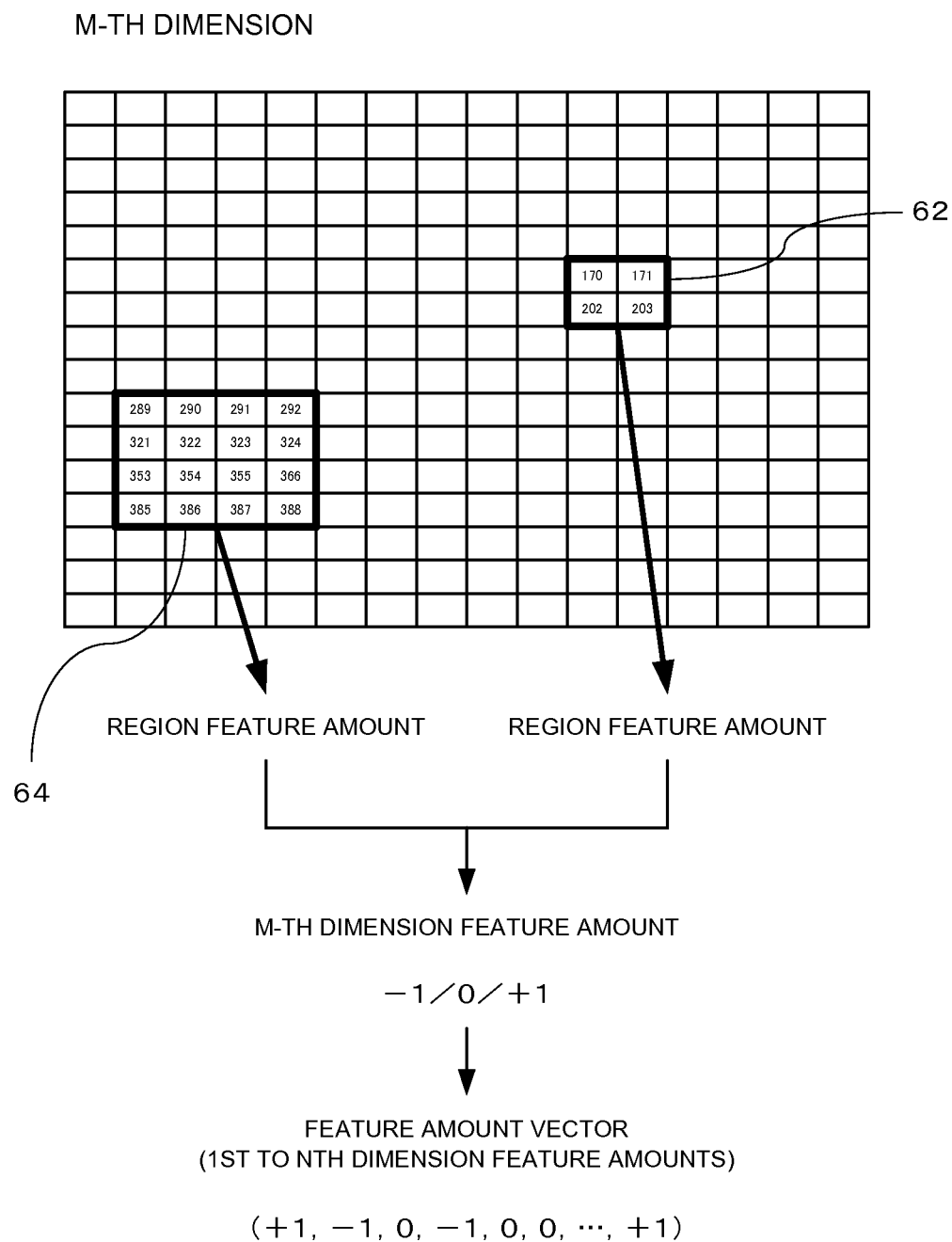
FIG. 6 is a diagram showing an image from which M-th dimension feature amounts are extracted.

FIG. 6 is a diagram showing an image from which M-th dimension feature amounts are extracted. In the example shown in FIG. 6, two subregions 62 and 64 correspond to the M-th dimension. In addition, the feature amount extracting unit 20 is capable of generating an M-th dimension feature amount based on a difference between a feature amount (region feature amount) of the subregion 62 and a feature amount (region feature amount) of the subregion 64. In this case, the feature amounts of the respective subregions 62 and 64 can be calculated by any method such as that based on an average value or a median value of pixel values in the respective subregions. In addition, the feature amount extracting unit 20 can generate an M-th dimension feature amount by quantizing a difference between the region feature amounts of the subregions 62 and 64 into three values (−1, 0, 1). By generating a feature amount for each of the dimensions (first to Nth dimensions), the feature amount extracting unit 20 can generate an Nth dimension feature amount vector. It should be noted that the method of calculating a feature amount of each dimension as described above is merely an example and a feature amount vector can be generated using any method.

FIG. 7 is a diagram showing an example of a feature amount vector stored in the coverage video feature amount storing unit 30. As shown in FIG. 7, a feature amount vector is stored in association with a video identifier and sequence information which indicates a chronological order of a frame image. Sequence information may be any information which enables an order of a feature amount vector to be assessed and, for example, a frame number can be used. Alternatively, if a data storage structure or the like enables a chronological order of a feature amount vector to be identified, sequence information need not necessarily be used. The edited video feature amount storing unit 32 and the broadcast video feature amount storing unit 34 can be configured in a similar manner to the coverage video feature amount storing unit 30.

Returning to FIG. 1, the corresponding relationship judging unit 24 judges a corresponding relationship between videos based on feature amount vectors stored in the feature amount storing unit 22. Specifically, a corresponding relationship between a coverage video (source video) and an edited video (derived video) and a corresponding relationship between the edited video (source video) and a broadcast video (derived video) are judged. Accordingly, a corresponding relationship between the coverage video (source video) and the broadcast video (derived video) can be indirectly judged via the edited video. Moreover, the corresponding relationship judging unit 24 is also capable of directly judging a corresponding relationship between a coverage video and a broadcast video without using an edited video.

Figure 8:
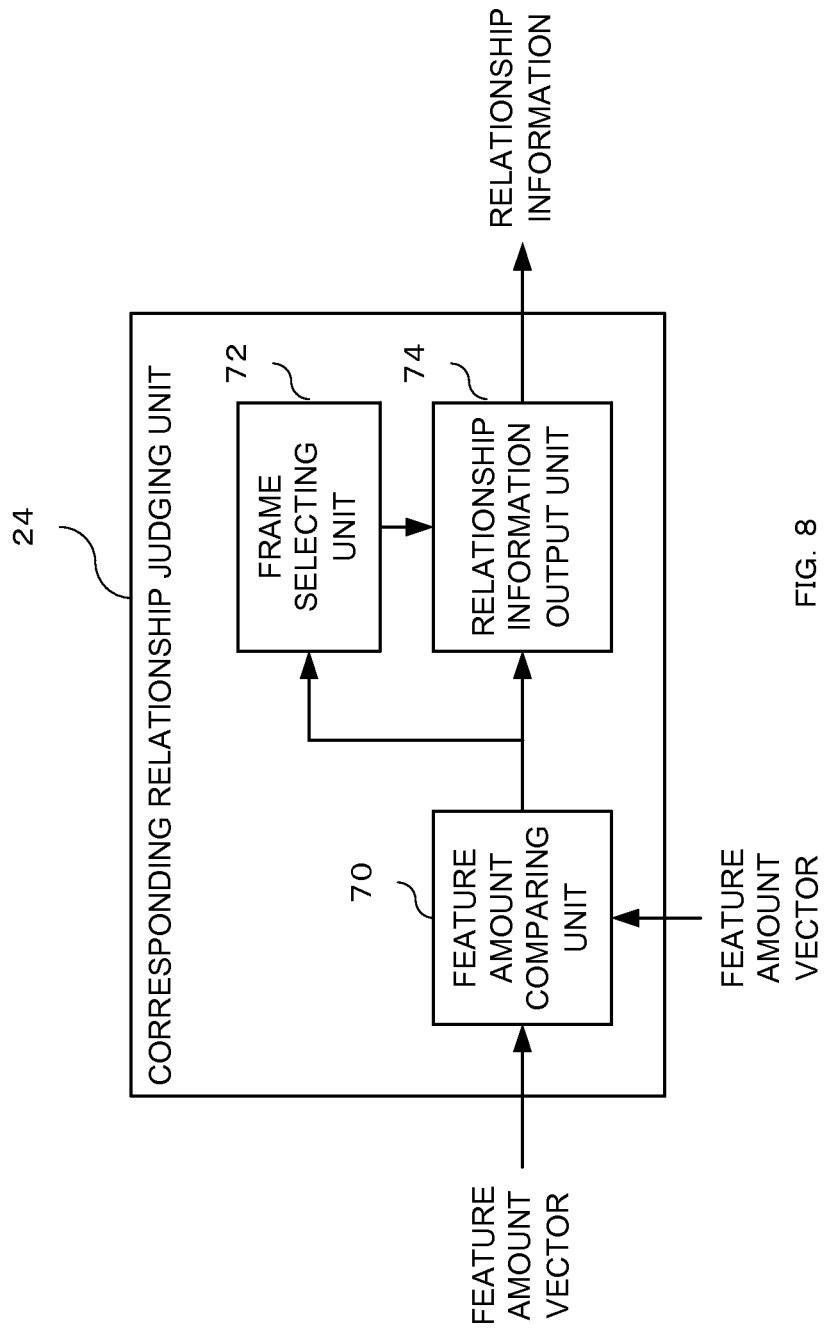
FIG. 8 is a diagram showing a configuration example of a corresponding relationship judging unit.

FIG. 8 is a diagram showing a configuration example of the corresponding relationship judging unit 24. As shown in FIG. 8, the corresponding relationship judging unit 24 can be configured so as to include a feature amount comparing unit 70, a frame selecting unit 72, and a relationship information output unit 74.

The feature amount comparing unit 70 compares a feature amount vector of a video that is a source video candidate with a feature amount vector of a video that is a derived video candidate on, for example, a per-frame basis. For example, the feature amount comparing unit 70 compares a feature amount vector of a coverage video with a feature amount vector of an edited video. In addition, the feature amount comparing unit 70 compares a feature amount vector of an edited video with a feature amount vector of a broadcast video.

The frame selecting unit 72 selects a frame image judged to have corresponding relationship (identity) between videos based on a result of a comparison by the feature amount comparing unit 70. Moreover, a judgment of identity between frame images can be performed by, for example, comparing the number of dimensions with identical feature amounts or comparing the number of dimensions with non-identical feature amounts between two feature amount vectors or by comparing sizes of two feature amount vectors.

The relationship information output unit 74 outputs relationship information that is information indicating a segment in which a corresponding relationship exists between videos. Specifically, the relationship information output unit 74 generates relationship information indicating a segment judged to have identity between frame images by the frame selecting unit 72 and stores the relationship information in the relationship information storing unit 26. In addition, the relationship information output unit 74 outputs information indicating a degree of modification of a segment having a corresponding relationship between videos based on a result of a comparison by the feature amount comparing unit 70. In this case, a degree of modification indicates a degree in which a modification is performed when creating a derived video using a source video by adding a telop or the like.

Figure 9:
FIG. 9 is a diagram showing an example of relationship information stored in a relationship information storing unit.

FIG. 9 is a diagram showing an example of relationship information stored in the relationship information storing unit 26. As shown in FIG. 9, relationship information includes information related to a source video, information related to a derived video, and information indicating a degree of modification. Information related to a source video or a derived video includes a video type, a video identifier, and segment information. A video type is information indicating any of a coverage video, an edited video, and a broadcast video. Segment information is information indicating a video segment and, for example, a playback time or a frame number of the segment in the video can be used.

FIG. 9 shows that three edited videos E1 to E3 have been created by utilizing a coverage video C1. More specifically, a segment "00:00 to 20:00" of the coverage video C1 has been utilized to create a segment "00:00 to 20:00" of the edited video E1 in a degree of modification of "0". In other words, it is shown that the edited video E1 is the segment "00:00 to 20:00" of the coverage video C1 extracted without modification. In a similar manner, it is shown that the edited videos E2 and E3 are, respectively, segments "20:00 to 40:00" and "40:00 to 60:00" of the coverage video C1 extracted without modification.

In addition, FIG. 9 also shows that a broadcast video B1 has been created using the edited videos E1 to E3. More specifically, a segment "00:00 to 05:00" of the edited video E1 is utilized in a segment "00:00 to 05:00" of the broadcast video B1 in a degree of modification of "2". In other words, it is shown that the segment "00:00 to 05:00" of the broadcast video B1 is the segment "00:00 to 05:00" of the edited video E1 with modification. In a similar manner, it is shown that a segment "05:00 to 15:00" of the broadcast video B1 is a segment "03:00 to 13:00" of the edited video E2 with modification and a segment "15:00 to 20:00" of the broadcast video B1 is a segment "02:00 to 07:00" of the edited video E3 with modification.

Returning to FIG. 1, the corresponding relationship display unit 28 displays a corresponding relationship between a source video and a plurality of derived videos and a utilization frequency of each segment in the source video by the plurality of derived videos based on the relationship information stored in the relationship information storing unit 26.

Figure 10:
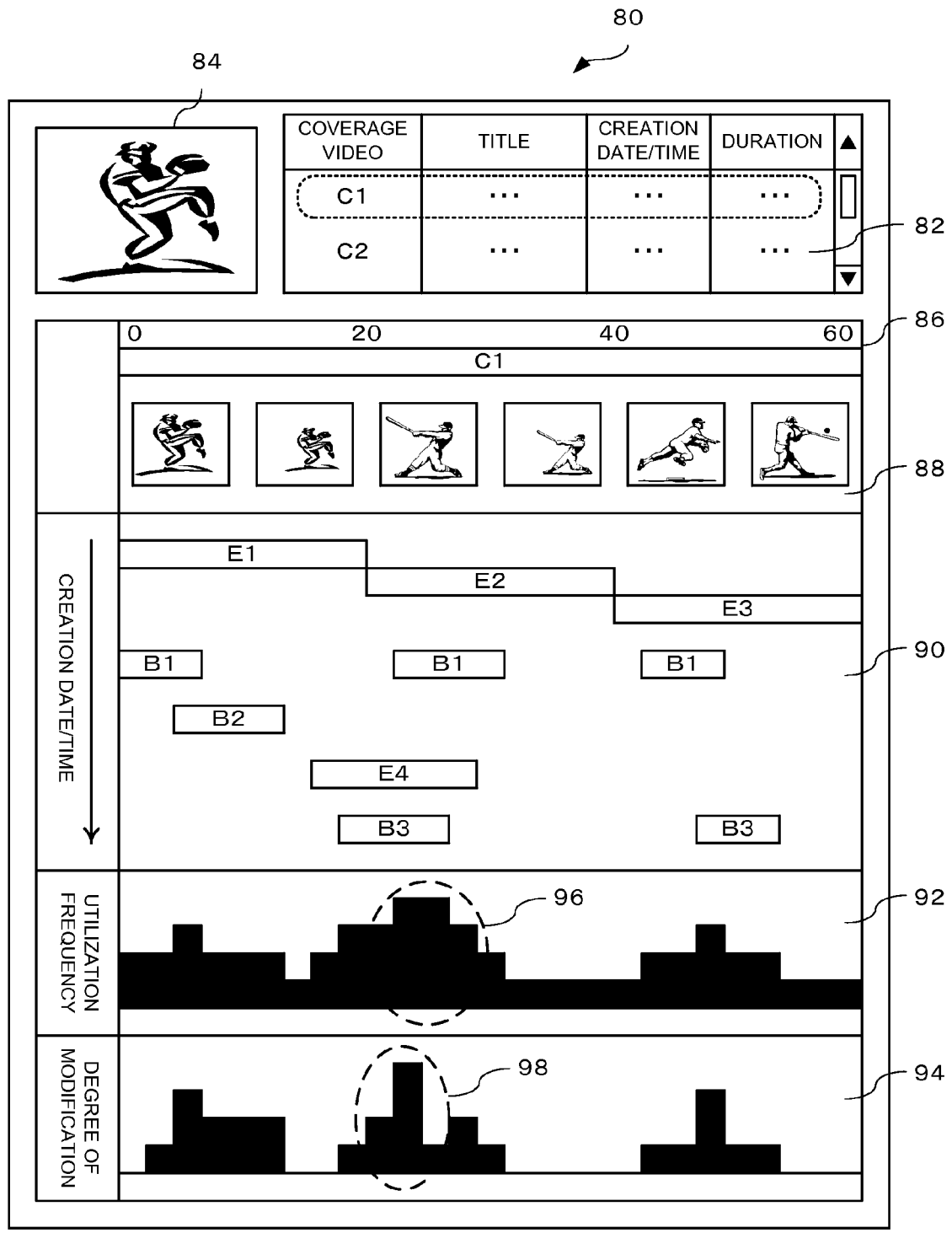
FIG. 10 is a diagram showing an example of a screen outputted by a corresponding relationship display unit.

FIG. 10 is a diagram showing an example of a screen outputted by the corresponding relationship display unit 28. The corresponding relationship display unit 28 is capable of displaying a corresponding relationship between videos based on relationship information stored in the relationship information storing unit 26. As shown in FIG. 10, a screen 80 includes regions 82 to 94.

The region 82 displays information for selecting a coverage video to be used as a source video. By referring to the coverage video DB 42, the corresponding relationship display unit 28 is capable of displaying information such as a video identifier, a title, and a creation date/time of a coverage video in the region 82. Moreover, in the region 82, the corresponding relationship display unit 28 may display information related to all coverage videos stored in the coverage video DB 42 or information related to only coverage videos with relationship information thereof stored in the relationship information storing unit 26. The region 82 is arranged so that a single coverage video can be selected by a user operation such as a click. The corresponding relationship display unit 28 can display information related to the coverage video selected in the region 82 in another region.

The region 84 displays representative thumbnail images of a coverage video. In addition, the region 86 displays a timeline of a coverage video, and the region 88 displays thumbnail images of the coverage video in accordance with the timeline. Moreover, the corresponding relationship display unit 28 can display thumbnail images of a coverage video by, for example, referring to the coverage video DB 42.

The region 90 displays information related to edited videos and broadcast videos which have corresponding relationship with a coverage video. As shown in FIG. 10, a timeline of each image is displayed in accordance with the timeline of the coverage video in the region 90 in order to provide a clear understanding of which part of a coverage video is utilized. For example, it is shown that the edited video E1 has a corresponding relationship with the segment "00:00 to 20:00" of the coverage video C1. In a similar manner, it is shown that the edited videos E2 and E3 respectively have corresponding relationship with segments "20:00 to 40:00" and "40:00 to 60:00" of the coverage video C1. It is further shown that, for example, the broadcast video B1 has a corresponding relationship with segments "00:00 to 05:00", "23:00 to 33:00", and "42:00 to 47:00" of the coverage video C1. Moreover, the corresponding relationship between the coverage video C1 and the broadcast video B1 can be derived from the corresponding relationship between the coverage video C1 and the edited videos E1 to E3 and the corresponding relationship between the edited videos E1 to E3 and the broadcast video B1.

In addition, the region 90 displays information related to a plurality of videos according to an order of creation dates/times of the videos. In other words, in the example shown in FIG. 10, videos are displayed in an order of the edited video E1, the edited video E2, the edited video E3, the broadcast video B1, the broadcast video B2, the edited video E4, and the broadcast video B3. In this manner, by arranging information displayed in the region 90 in an order of the creation dates/times of the videos, how videos had derived from a coverage video can be confirmed along a temporal sequence. Moreover, when displaying information related only to broadcast videos in the region 90, the information can also be displayed in an order of the number of times the broadcast videos had been broadcasted. In addition, for example, when the derived videos are videos posted on a video site, the information can also be displayed in a chronological order of posting (uploading) of the videos or an order of the number of times the videos had been viewed.

The region 92 displays information indicating a utilization frequency of each segment of a coverage video by edited videos and broadcast videos. In the example shown in FIG. 10, the number of times the respective segments of a coverage video had been used is indicated as a graph in accordance with a timeline of the coverage video. The graph shows that, for example, a utilization frequency of a range enclosed by a circle 96 is high. In addition, referring to the timeline of the coverage video, it is found that a utilization frequency in a vicinity of the segment "20:00 to 30:00" of the coverage video is high. Furthermore, scenes represented by segments with high utilization frequencies can be assessed by referring to the thumbnail images in the region 88. Moreover, if the derived videos are illegal videos, an assessment can be made as to which segments of a source video has been utilized in an illegal manner.

The region 94 displays information indicating a degree of modification of each segment of a coverage video by edited videos and broadcast videos. In the example shown in FIG. 10, the degrees of modification of the respective segments of a coverage video are indicated as a graph in accordance with a timeline of the coverage video. The graph shows that, for example, a degree of modification of a range enclosed by a circle 98 is high. In addition, referring to the timeline of the coverage video, it is found that a degree of modification in a vicinity of the segment "20:00 to 25:00" of the coverage video is high. Furthermore, scenes represented by segments with high degrees of modification can be assessed by referring to the thumbnail images in the region 88.

Figure 11:
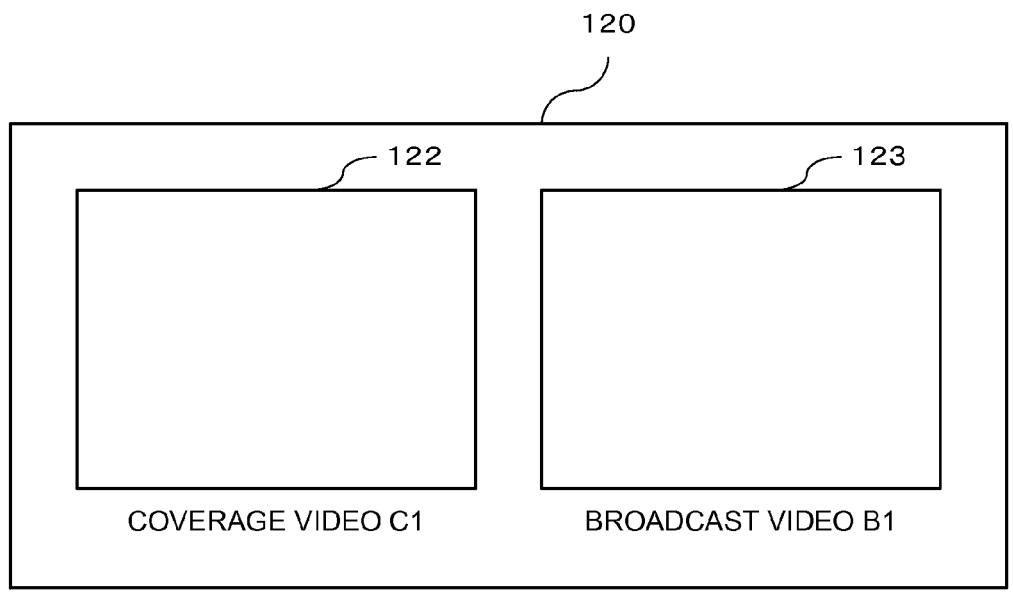
FIG. 11 is a diagram showing an example of a screen displaying a source video and a derived video.

In addition, when a segment of a video is selected in the region 90, the corresponding relationship display unit 28 can output a screen displaying a video of the selected segment and a coverage video corresponding to the segment. An example is shown in FIG. 11. A screen 120 includes a region 122 in which a coverage video is displayed and a region 123 in which an edited video or a broadcast video is displayed. The corresponding relationship display unit 28 acquires segment information of the selected segment from relationship information, and acquires a video of the segment from the video database 40 and displays the same in the regions 122 and 123. Alternatively, the corresponding relationship display unit 28 may be configured so as to display a video of a selected segment in the region 92 or the region 94 instead of in the region 90. For example, when a segment is selected in the region 92, a coverage video in a vicinity of the segment and edited videos or broadcast videos created by utilizing the coverage video can be displayed side by side. In this manner, by displaying a video of a selected segment, contents of modification between videos can be confirmed without having to play back and compare all segments of videos in which a corresponding relationship exists.

Figure 12:
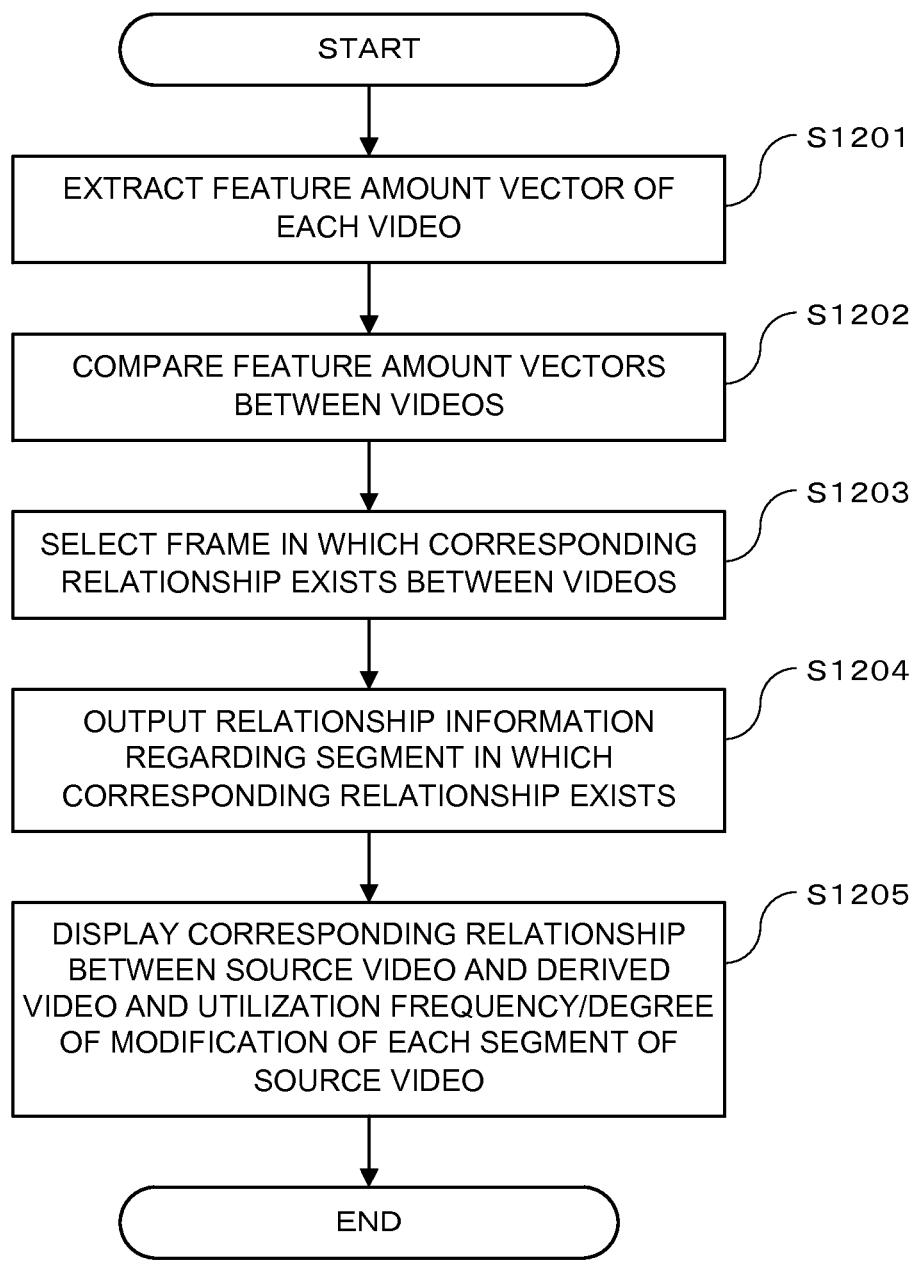
FIG. 12 is a flow chart showing an example of processing in an inter-video corresponding relationship display system.

FIG. 12 is a flow chart showing an example of processing by the inter-video corresponding relationship display system 10. First, the feature amount extracting unit 20 extracts a feature amount vector for each video stored in the video database 40 and stores the feature amount vectors in the feature amount storing unit 22 (S1201).

The feature amount comparing unit 70 refers to the feature amount storing unit 22 and compares feature amount vectors between videos (S1202). The frame selecting unit 72 selects a frame image in which a corresponding relationship (identity) exists based on a result of the comparison by the feature amount comparing unit 70 (S1203). In addition, the relationship information output unit 74 stores relationship information regarding segments including the selected frame image in the relationship information storing unit 26 (S1204).

Finally, the corresponding relationship display unit 28 displays a corresponding relationship between a source video (coverage video) and derived videos (edited video and broadcast video) as well as a utilization frequency and a degree of modification of each segment of the source video based on the relationship information stored in the relationship information storing unit 26 (S1205).

This concludes the description of the present embodiment. With the inter-video corresponding relationship display system 10 according to the present embodiment, since a utilization frequency and a degree of modification of each segment of a source video by a derived video are displayed together with a corresponding relationship between the source video and the derived video, the utilization frequency and the degree of modification of each segment of the source video can be readily assessed.

It should be noted that the present embodiment is for facilitating understanding of the present invention and is not for limiting the interpretation of the present invention. Various modifications and changes may be made to the present invention without departing from the spirit and scope thereof, and equivalents are to be included in the present invention.

The present application claims priority on the basis of Japanese Patent Application No. 2011-027189 filed on Feb. 10, 2011, the entire contents of which are incorporated herein by reference.

While the present invention has been described with reference to an embodiment, the present invention is not limited to the embodiment described above. Various modifications to configurations and details of the present invention will occur to those skilled in the art without departing from the scope of the present invention.

A part of or all of the present embodiment may also be described as, but not limited to, the appendices provided below.

(Appendix 1) An inter-video corresponding relationship display system, comprising: a relationship information storing unit configured to store relationship information that is information indicating a segment in which a corresponding relationship exists between a source video and a plurality of derived videos created using at least a part of segments of the source video; and a corresponding relationship display unit configured to display a segment corresponding relationship between the source video and the plurality of derived videos and a utilization frequency of each segment of the source video by the plurality of derived videos based on the relationship information stored in the relationship information storing unit.

(Appendix 2) The inter-video corresponding relationship display system according to Appendix 1, wherein the corresponding relationship display unit is configured to display the utilization frequency in accordance with a time axis of the source video.

(Appendix 3) The inter-video corresponding relationship display system according to Appendix 2, wherein the corresponding relationship display unit is configured to display the corresponding relationship in accordance with a time axis of the source video for each of the plurality of derived videos.

(Appendix 4) The inter-video corresponding relationship display system according to Appendix 3, wherein based on order information for identifying an order of creation among the plurality of derived videos stored in a predetermined storing unit, the corresponding relationship display unit is configured to display the corresponding relationship of the plurality of derived videos according to the order of creation.

(Appendix 5) The inter-video corresponding relationship display system according to Appendix 3, wherein based on frequency information for identifying a utilization frequency of each of the plurality of derived videos stored in a predetermined storing unit, the corresponding relationship display unit is configured to display the corresponding relationship of the plurality of derived videos according to an order of utilization frequencies of the derived videos.

(Appendix 6) The inter-video corresponding relationship display system according to Appendices 1 to 5, wherein the relationship information storing unit is configured to store relationship information regarding a plurality of the source videos, and wherein the corresponding relationship display unit is configured to: display information for selecting one of the plurality of the source videos; and display the corresponding relationship and the utilization frequency of the one source video selected by a user operation in response to the display.

(Appendix 7) The inter-video corresponding relationship display system according to any one of Appendices 1 to 6, wherein the relationship information storing unit is configured to store modification degree information that is information indicating a degree of modification from the source video to the derived video in a segment, in which the corresponding relationship exists, in association with the segment, and wherein the corresponding relationship display unit is configured to display degrees of modification of the plurality of derived videos in respective segments of the source video together with the corresponding relationship and the utilization frequency.

(Appendix 8) The inter-video corresponding relationship display system according to Appendix 7, wherein the corresponding relationship display unit is configured to display the degree of modification in accordance with a time axis of the source video.

(Appendix 9) The inter-video corresponding relationship display system according to any one of Appendices 1 to 8, further comprising: a feature amount storing unit configured to store in association with each video a feature amount of each predetermined segment that constitutes a video; a feature amount comparing unit configured to compare feature amounts of the segments corresponding to a plurality of videos including the source video and a derived video; and a relationship information output unit configured to output the relationship information based on a result of the comparison of the feature amounts of the segments and store the relationship information in the relationship information storing unit.

(Appendix 10) The inter-video corresponding relationship display system according to any one of Appendices 1 to 9, wherein at least one of the plurality of derived videos is a video created by utilizing at least a part of segments of the derived video.

(Appendix 11) An inter-video corresponding relationship display method, comprising: storing in a relationship information storing unit relationship information that is information indicating a segment in which a corresponding relationship exists between a source video and a plurality of derived videos created using at least a part of segments of the source video; and displaying a corresponding relationship of the segment between the source video and the plurality of derived videos and a utilization frequency of each segment of the source videos by the plurality of derived videos, based on the relationship information stored in the relationship information storing unit. 10 inter-video corresponding relationship display system
20 feature amount extracting unit
22 feature amount storing unit
24 corresponding relationship judging unit
26 relationship information storing unit
28 corresponding relationship display unit
30 coverage video feature amount storing unit
32 edited video feature amount storing unit
34 broadcast video feature amount storing unit
40 video database
42 coverage video database
44 edited video database
46 broadcast video database
70 feature amount comparing unit
72 frame selecting unit
74 relationship information output unit

We claim:

1. An inter-video corresponding relationship display system, comprising:
   a relationship information storing unit configured to store relationship information that is information indicating a segment in which a corresponding relationship exists between a source video and a plurality of derived videos created using at least a part of segments of the source video; and
   a corresponding relationship display unit configured to display a segment corresponding relationship between the source video and the plurality of derived videos and a utilization frequency of each segment of the source video by the plurality of derived videos based on the relationship information stored in the relationship information storing unit
   wherein the relationship information storing unit is configured to store modification degree information that is information indicating a degree of modification from the source video to the derived video in a segment, in which the corresponding relationship exists, in association with the segment, and
   wherein the corresponding relationship display unit is configured to display degrees of modification of the plurality of derived videos in respective segments of the source video together with the corresponding relationship and the utilization frequency.

2. The inter-video corresponding relationship display system according to claim 1, wherein the corresponding relationship display unit is configured to display the utilization frequency in accordance with a time axis of the source video.

3. The inter-video corresponding relationship display system according to claim 2, wherein the corresponding relationship display unit is configured to display the corresponding relationship in accordance with a time axis of the source video for each of the plurality of derived videos.

4. The inter-video corresponding relationship display system according to claim 3, wherein based on order information for identifying an order of creation among the plurality of derived videos stored in a predetermined storing unit, the corresponding relationship display unit is configured to display the corresponding relationship of the plurality of derived videos according to the order of creation.

5. The inter-video corresponding relationship display system according to claim 3, wherein based on frequency information for identifying a utilization frequency of each of the plurality of derived videos stored in a predetermined storing unit, the corresponding relationship display unit is configured to display the corresponding relationship of the plurality of derived videos according to an order of utilization frequencies of the derived videos.

6. The inter-video corresponding relationship display system according to claim 1,
   wherein the relationship information storing unit is configured to store relationship information regarding a plurality of the source videos, and
   wherein the corresponding relationship display unit is configured to:
   display information for selecting one of the plurality of the source videos; and
   display the corresponding relationship and the utilization frequency of the one source video selected by a user operation in response to the display.

7. The inter-video corresponding relationship display system according to claim 1, wherein the corresponding relationship display unit is configured to display the degree of modification in accordance with a time axis of the source video.

8. The inter-video corresponding relationship display system according to claim 1, further comprising:
   a feature amount storing unit configured to store in association with each video a feature amount of each predetermined segment that constitutes a video;
   a feature amount comparing unit configured to compare feature amounts of the segments corresponding to a plurality of videos including the source video and a derived video; and
   a relationship information output unit configured to output the relationship information based on a result of the comparison of the feature amounts of the segments and store the relationship information in the relationship information storing unit.

9. The inter-video corresponding relationship display system according to claim 1, wherein at least one of the plurality of derived videos is a video created by utilizing at least a part of segments of the derived video.

10. An inter-video corresponding relationship display method, comprising:
    storing in a relationship information storing unit relationship information that is information indicating a segment in which a corresponding relationship exists between a source video and a plurality of derived videos created using at least a part of segments of the source video; and
    displaying a corresponding relationship of the segment between the source video and the plurality of derived videos and a utilization frequency of each segment of the source videos by the plurality of derived videos, based on the relationship information stored in the relationship information storing unit,
    wherein the relationship information storing unit is configured to store modification degree information that is information indicating a degree of modification from the source video to the derived video in a segment, in which the corresponding relationship exists, in association with the segment, and
    wherein the corresponding relationship display unit is configured to display degrees of modification of the plurality of derived videos in respective segments of the source video together with the corresponding relationship and the utilization frequency.

* * * * *